United States Patent
Iino

(10) Patent No.: US 10,168,780 B2
(45) Date of Patent: Jan. 1, 2019

(54) INPUT DEVICE, DISPLAY DEVICE, AND METHOD FOR CONTROLLING INPUT DEVICE

(71) Applicant: FUJITSU TEN LIMITED, Kobe-shi, Hyogo (JP)

(72) Inventor: Masahiro Iino, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 5 days.

(21) Appl. No.: 15/390,270

(22) Filed: Dec. 23, 2016

(65) Prior Publication Data

US 2017/0220114 A1 Aug. 3, 2017

(30) Foreign Application Priority Data

Feb. 2, 2016 (JP) .................................. 2016-018349

(51) Int. Cl.
| | | |
|---|---|---|
| *G06F 3/01* | (2006.01) | |
| *G06F 3/041* | (2006.01) | |
| *B60K 35/00* | (2006.01) | |
| *B60K 37/06* | (2006.01) | |
| *G06F 3/0488* | (2013.01) | |
| *B60H 1/00* | (2006.01) | |
| *G06F 3/0484* | (2013.01) | |

(52) U.S. Cl.
CPC ......... *G06F 3/016* (2013.01); *B60H 1/00985* (2013.01); *B60K 35/00* (2013.01); *B60K 37/06* (2013.01); *G06F 3/0412* (2013.01); *G06F 3/0416* (2013.01); *G06F 3/04883* (2013.01); *B60K 2350/1028* (2013.01); *B60K 2350/1052* (2013.01); *B60K 2350/1056* (2013.01); *B60K 2350/1076* (2013.01); *B60K 2350/352* (2013.01); *G06F 3/04847* (2013.01)

(58) Field of Classification Search
CPC ...... G06F 3/016; G06F 3/0412; G06F 3/0416; G06F 3/04883; G06F 3/04847; B60K 35/00; B60K 37/06; B60K 2350/1028; B60K 2350/1052; B60K 2350/1056; B60K 2350/1076; B60K 2350/352; B60H 1/00985
See application file for complete search history.

(56) References Cited

U.S. PATENT DOCUMENTS

| | | | |
|---|---|---|---|
| 9,696,807 B2* | 7/2017 | Fleizach | G06F 3/016 |
| 2014/0098038 A1* | 4/2014 | Paek | G06F 1/1692 |
| | | | 345/173 |

FOREIGN PATENT DOCUMENTS

| | | |
|---|---|---|
| JP | 2004-362428 A | 12/2004 |
| JP | 2013-235614 A | 11/2013 |

* cited by examiner

*Primary Examiner* — Stephen G Sherman
(74) *Attorney, Agent, or Firm* — Oliff PLC

(57) ABSTRACT

An input device according to the present embodiment includes a detection unit, a vibration unit, and a vibration control unit. The detection unit detects a touch position on an operation surface. The vibration unit vibrates the operation surface. The vibration control unit controls the vibration unit to provide different vibration modes between a case where a direction of movement of the touch position is a first direction defined on the operation surface and a case where the direction of movement is a second direction different from the first direction.

8 Claims, 9 Drawing Sheets

FIG.4

| TARGET DEVICE | GESTURE OPERATION | FUNCTION |
|---|---|---|
| AIR CONDITIONER | CIRCLE | WIND DIRECTION ADJUSTMENT |
| | ... | ... |
| | TRIANGLE | TEMPERATURE/AIR VOLUME ADJUSTMENT |
| | ... | ... |
| AUDIO | ... | ... |
| TELEPHONE | ... | ... |
| INTERIOR LIGHT | ... | ... |
| ... | ... | ... |

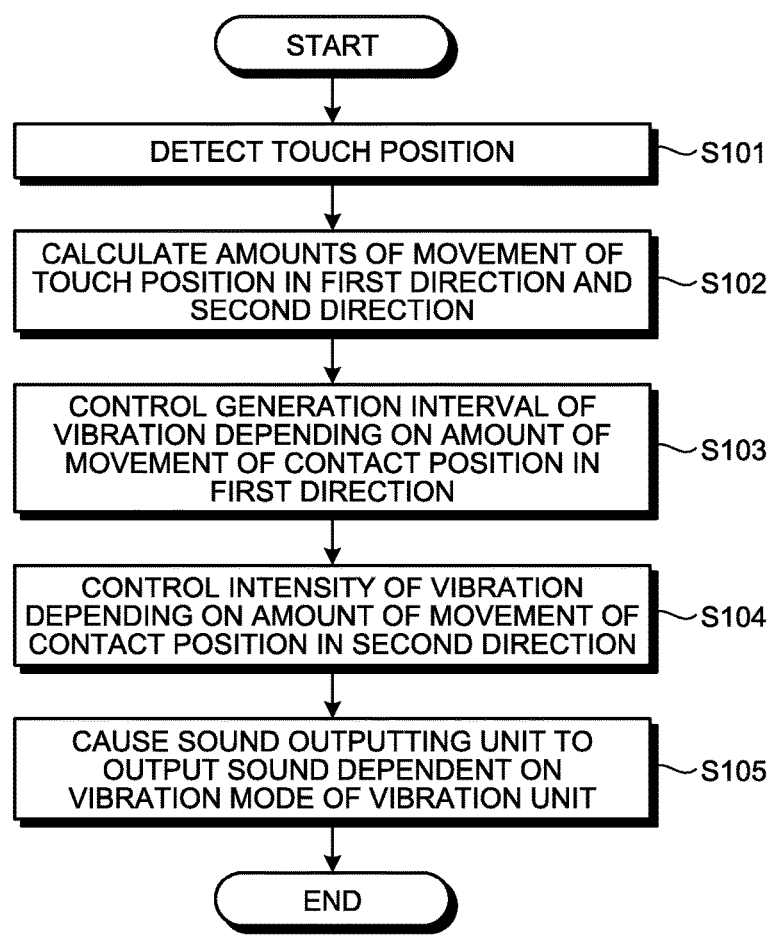

INPUT DEVICE, DISPLAY DEVICE, AND METHOD FOR CONTROLLING INPUT DEVICE

CROSS-REFERENCE TO RELATED APPLICATION

This application is based upon and claims the benefit of priority of the prior Japanese Patent Application No. 2016-018349, filed on Feb. 2, 2016, the entire contents of which are incorporated herein by reference.

FIELD

The embodiment discussed herein is directed to an input device, a display device, and a method for controlling an input device.

BACKGROUND

Conventionally, an input device has been known that provides a user with a sense of touch to inform that input has been accepted. For example, such an input device generates vibration depending on pressing force provided by a user to inform the user that input has been accepted (see, for example, Japanese Laid-open Patent Publication No. 2013-235614).

However, a conventional input device merely generates vibration depending on pressing force, and there is room for further improvement in that user operability thereof is improved.

SUMMARY

An input device according to an embodiment includes a detection unit, a vibration unit, a vibration control unit. the detection unit that detects a touch position on an operation surface. the vibration unit that vibrates the operation surface. And the vibration control unit that controls the vibration unit to provide different vibration modes between a case where a direction of movement of the touch position is a first direction defined on the operation surface and a case where the direction of movement is a second direction different from the first direction.

BRIEF DESCRIPTION OF DRAWINGS

More complete recognition of the present invention and an advantage involved therewith could readily be understood by reading the following detailed description of the invention in conjunction with the accompanying drawings.

FIG. 4 is a diagram illustrating an example of gesture information.

FIG. 6 is a flowchart illustrating an example of control steps for an input device according to the present embodiment.

DESCRIPTION OF EMBODIMENT

Hereinafter, an embodiment of an input device, a display device, and method for controlling an input device as disclosed in the present application will be described in detail, with reference to the accompanying drawings. This invention is not limited by the embodiment as illustrated below.

Figure 1A:
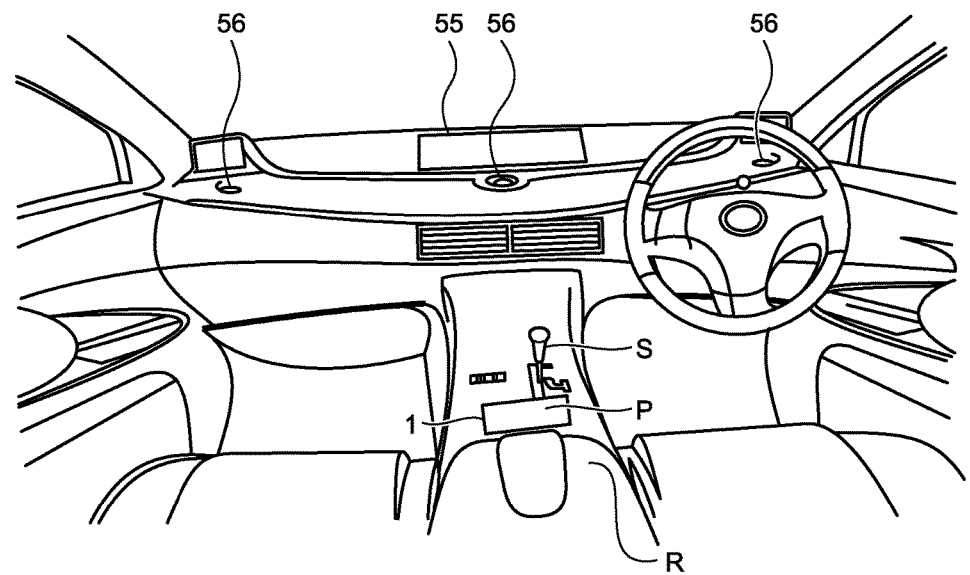
FIG. 1A is a diagram illustrating an example of mounting of an input device according to the present embodiment.
Figure 1B:
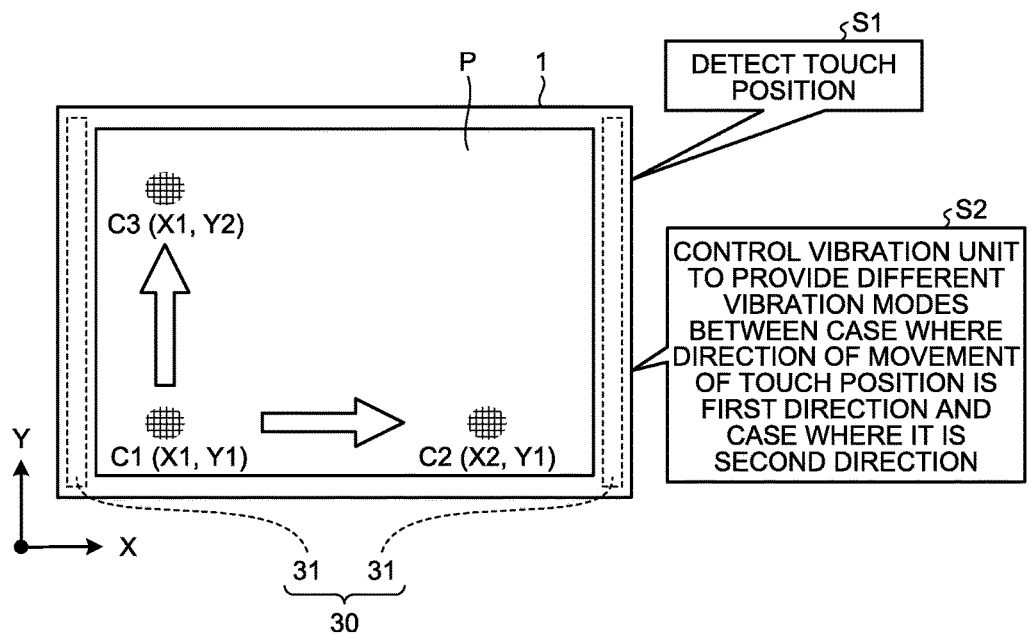
FIG. 1B is a diagram illustrating an outline of a method for controlling an input device according to the present embodiment.

First, an outline of an input device according to the present embodiment will be described by using FIG. 1A and FIG. 1B. FIG. 1A is a diagram illustrating an example of mounting of an input device according to the present embodiment. FIG. 1B is a diagram illustrating an outline of method for controlling an input device according to the present embodiment.

As illustrated in FIG. 1A, an input device 1 according to the present embodiment is mounted on a vehicle. For example, the input device 1 is connected to an on-vehicle apparatus 50 as described later with reference to FIG. 2, through a network, and functions as an input device for the on-vehicle apparatus 50. The input device 1 includes an operation acceptance member (that will be described as an operation surface P) that accepts a user operation, such as a touchpad.

The operation surface P is arranged at a position where it is readily operated by a driver, for example, near a shift lever S of a center console, or the like. In an example of FIG. 1A, the operation surface P is arranged between an armrest R and the shift lever S. Therefore, a user can operate the operation surface P in a state where his or her arm is put on the armrest R. Thereby, a user can readily operate the input device 1 without changing his or her driving posture.

The on-vehicle apparatus 50 includes, for example, a variety of instruments such as a car navigation system, an air conditioner, or an audio device. Therefore, a user can operate the input device 1 to operate such a variety of instruments. The on-vehicle apparatus 50 includes a display 55 that displays a predetermined image and speakers 56 (examples of a sound output unit) that output a predetermined sound.

An image that is displayed on the display 55 includes an image for executing navigation of a vehicle such as a map, a television or internet video, an image that indicates a state of an air conditioner or an audio device, or the like. A sound that is output from the speakers 56 includes a sound for executing navigation of a vehicle, or a sound, music, or the like of a video, a television, an audio device, or the like.

Meanwhile, in regard to a conventional input device, a driver that is a user may be in visual contact with the display 55 or the input device 1 in order to confirm operation content in a case where the input device is used to operate each instrument of the on-vehicle apparatus 50 during driving of a vehicle. However, such an action for visual contact is burdensome to a user, and hence, deterioration of user operability of an input device may be caused.

In such a situation, in regard to the input device 1 according to the present embodiment, a vibration mode of the operation surface P is controlled depending on operation content, so that a user is caused to intuitively recognize the operation content through a sense of touch and thereby user operability thereof is improved. Hereinafter, an outline of a method for controlling the input device 1 according to the present embodiment will be described by using FIG. 1B.

As illustrated in FIG. 1B, the input device 1 includes the operation surface P as described above and a vibration unit 30 that vibrates the operation surface P. The vibration unit 30 is, for example, a vibration element 31, and herein, an example of the vibration unit 30 that includes two vibration elements 31 arranged at positions to interpose the operation surface P therebetween is illustrated. Although a case where the number of the vibration elements 31 is two provided has been illustrated herein, the number of the vibration elements 31 may be greater than two. The vibration unit 30 is not limited to the vibration element(s) 31 and may be a motor that vibrates the operation surface P, or the like.

The vibration elements 31 are, for example, piezoelectric elements (piezo elements) that can vibrate the operation surface P in an ultrasonic range or band. For example, as the vibration elements 31 are vibrated in a state where a user pushes the operation surface P, an air layer can be formed between his or her finger and the operation surface P to change friction force therebetween, and a sense of touch that is provided to the user can be changed.

Such a sense of touch is changed by changing a vibration mode of the vibration unit 30. Such a vibration mode is controlled by changing a generation interval of vibration, a vibration intensity, a frequency of vibration, and/or the like.

For example, as the vibration elements 31 vibrate the operation surface P in an ultrasonic range, the air layer as described above is formed between the operation surface P and a finger of a user to reduce friction force therebetween, so that a smooth sense of touch can be provided to the user. A generation interval of vibration of the vibration elements 31 is switched with a predetermined period of time, and thereby, a sense of touch can also be provided to a user as if irregularities were present on the operation surface P. Herein, a vibration intensity of the vibration elements 31 is changed, and thereby, a degree of the sense of touch as described above can also be changed.

Thus, the input device 1 changes a vibration mode of the vibration unit 30, so that a magnitude of friction force between a user and the operation surface P can be changed and a sense of touch that is provided to the user can be changed.

Therefore, for example, the input device 1 detects touch positions C1 to C3 (that will collectively be described as "touch positions C", below) on the operation surface P and controls the vibration unit 30 so as to provide different vibration modes depending on a direction of movement of such a touch position C, so that a user can be caused to recognize the direction of movement of the touch position C on the operation surface P and operation content that corresponds to the direction of movement.

Specifically, as illustrated in FIG. 1B, first, the input device 1 detects a touch position C on the operation surface P (step S1). Then, the input device 1 controls the vibration unit 30 so as to provide different vibration modes between a case where a direction of movement of the touch position C is a first direction defined on the operation surface P (for example, a direction of an X-axis, herein) and a case where it is a second direction different from the first direction (for example, a direction of a Y-axis) (step S2). Although a case where the first direction and the second direction are orthogonal to one another has been illustrated herein, they may be substantially orthogonal to one another.

In more detail, for example, in a state where a finger of a user contacts the operation surface P, it moves from the touch position C1 to the touch position C2 in a direction of an X-axis that is the first direction defined on the operation surface P. In such a case, for example, the input device 1 changes a generation interval of vibration of the vibration unit 30 to control lengths of irregularities in a sense of touch like the irregularities as described above. In such a case, the input device 1 controls the vibration unit 30, for example, in such a manner that lengths of irregularities increase with increasing an amount of movement of a touch position C in a direction of the X-axis.

On the other hand, in a state where a finger of a user contacts the operation surface P and in a case where it moves from the touch position C1 to the touch position C3 in a direction of a Y-axis, the input device 1 changes a vibration intensity of the vibration unit 30 to control heights of irregularities in a sense of touch like the irregularities as described above. In such a case, the input device 1 controls the vibration unit 30, for example, in such a manner that heights of irregularities increase with increasing an amount of movement of a touch position C in a direction of the Y-axis.

Therefore, a user can recognize a case where a direction of movement of a touch position C is a direction of the X-axis, based on lengths of irregularities in a sense of touch, and recognize a case where a direction of movement of a touch position C is a direction of the Y-axis, based on heights of irregularities in a sense of touch.

Thus, the input device 1 controls a vibration mode of the vibration unit 30 depending on a direction of movement of a touch position C with respect to the X-axis and the Y-axis. Thereby, a user can intuitively recognize a direction of a contact operation on the operation surface P. The input device 1 controls a vibration mode of the vibration unit 30 based on amounts of movement of a touch position C in a direction of the X-axis and a direction of the Y-axis, and hence, a user can be caused to recognize amounts of movement of a touch position C in a direction of the X-axis and a direction of the Y-axis, based on a change in a sense of touch to the operation surface P.

Therefore, a user can recognize operation content without being in visual contact with the operation surface P or the display 55. Thereby, the input device 1 can improve user operability thereof.

The content of a sense of touch as described above is an example, and the input device 1 can change a vibration mode of the vibration unit 30 to provide a user with a wide variety of senses of touch.

In the example as described above, a case where the first direction and the second direction are orthogonal or substantially orthogonal to one another has been illustrated and this is not limiting, wherein it is sufficient that an angle of intersection between the first direction and the second direction is an angle of intersection such that a user is capable of recognizing a difference between the directions intuitively, where it can be, for example, 45 degrees or greater. Thereby, a user can intuitively recognize a direction of an operation, and hence, the input device 1 can improve user operability thereof.

The first direction and the second direction are not limited to a direction of the X-axis and a direction of the Y-axis as illustrated in FIG. 1B, respectively. For example, the first direction may be a direction of the Y-axis and the second direction may be a direction of the X-axis. For example, at least one of the first direction and the second direction may be an oblique direction on the operation surface P (a direction that exists between a direction of the X-axis and a direction of the Y-axis) or the like. The first direction and the second direction may be a clockwise direction and a counterclockwise direction of a circle, respectively, or the like.

In the example as described above, a case where the input device 1 and the display 55 of the on-vehicle apparatus 50 are separate units has been illustrated and this is not limiting. The input device 1 and the display 55 may be configured as a single unit. In such a case, the input device 1 is configured as, for example, a touch panel.

In such a case, the input device 1 can provide a user with a sense of touch that corresponds to an image that is displayed on a touch panel. Thereby, a user can be provided with an operational feeling that uses a sense of touch in addition to a sense of vision. Herein, for example, a sound dependent on a sense of touch that is provided to a user may be output from a touch panel.

Although an instrument that is connected to the input device 1 is the on-vehicle apparatus 50 in the above description, this is illustration and not limiting, and an instrument that is connected to the input device 1 may be, for example, a smartphone, a tablet terminal, a personal computer, or the like.

Figure 2:
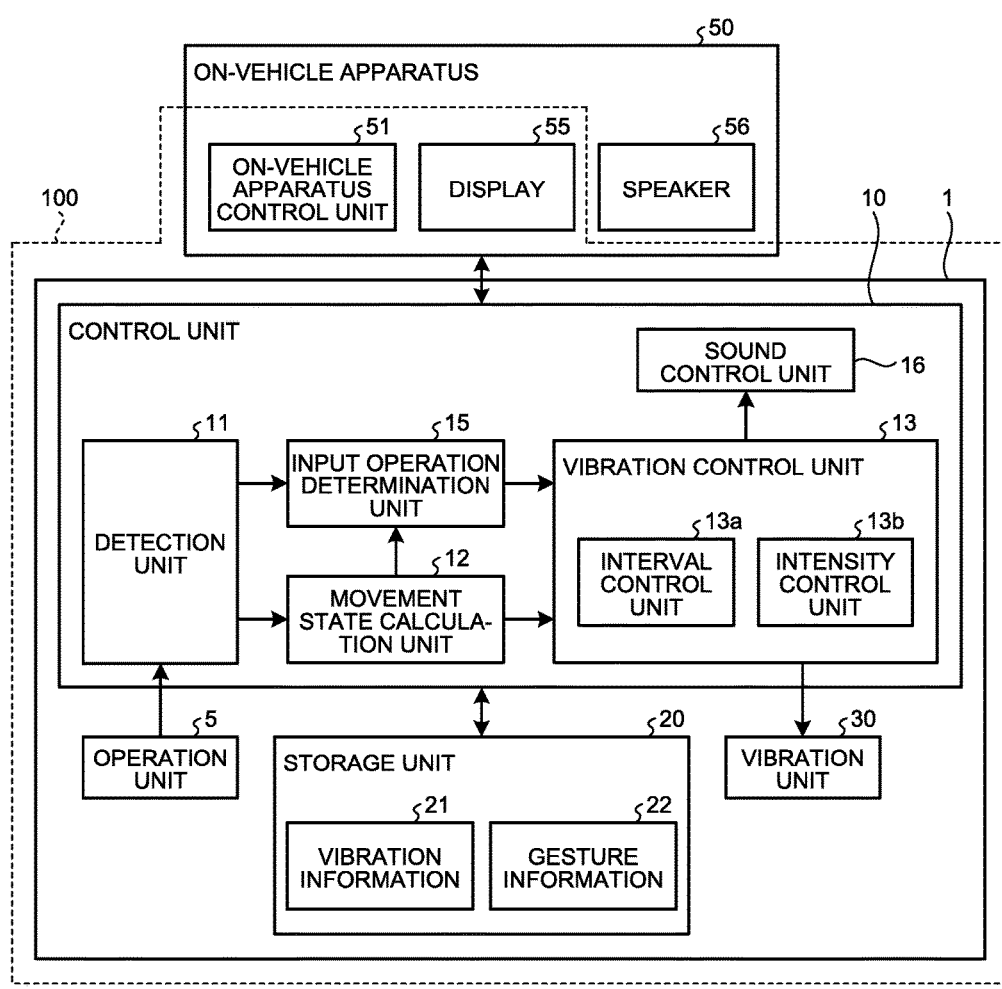
FIG. 2 is a block diagram illustrating a configuration example of an input device according to the present embodiment.

Hereinafter, the input device 1 that is controlled by the control method as described above will further be described. First, a configuration example of the input device 1 according to the present embodiment will be described by using FIG. 2. FIG. 2 is a block diagram illustrating a configuration example of the input device 1 according to the embodiment. In the following embodiment, for the sake of providing a simple explanation, the first direction and the second direction are a direction of the X-axis and a direction of the Y-axis that are orthogonal to one another, respectively.

As illustrated in FIG. 2, the input device 1 includes an operation unit 5, a control unit 10, a storage unit 20, and a vibration unit 30. The input device 1 is connected to the on-vehicle apparatus 50.

For example, the operation unit 5 has a flat-plate-type sensor such as a touchpad and includes an operation surface P that accepts an input operation to be provided by a user (see FIG. 1B). The operation unit 5 detects a touch position C on the operation surface P, and then, outputs a sensor value that indicates the touch position C to the control unit 10.

The vibration unit 30 vibrates the operation surface P according to control to be executed by the control unit 10 as described later. The vibration unit 30 includes, for example, a vibration element(s) 31 that vibrate(s) the operation surface P in an ultrasonic range or band (see FIG. 1B). The vibration unit 30 may vibrate the operation surface P in a frequency band that is lower than an ultrasonic range or band. That is, the vibration unit 30 may vibrate the operation surface P in a frequency range or band that is lower than an ultrasonic range or band. In such a case, for example, the vibration unit 30 can also vibrate the input device 1, per se.

The control unit 10 controls a vibration mode of the vibration unit 30 to control vibration of the operation surface P. The control unit 10 includes, for example, a microcomputer that has a Central Processing Unit (CPU), a Read Only Memory (ROM), a Random Access Memory (RAM), an input/output port, and the like, and a variety of circuits. The control unit 10 includes a detection unit 11, a movement state calculation unit 12, a vibration control unit 13, an input operation determination unit 15, and a sound control unit 16.

The detection unit 11 detects a touch position C on the operation surface P. Specifically, the detection unit 11 detects a touch position C on the operation surface P based on a sensor value that is input from the operation unit 5, and outputs such a touch position C to the movement state calculation unit 12 and the input operation determination unit 15.

The detection unit 11 executes a process for detection of a touch position C with a predetermined period of time, and thereby, even in a case where the touch position C moves on the operation surface P, the touch position C can be detected by following such movement. Even in a case where a user simultaneously contacts the operation surface P at two or more points thereon, the detection unit 11 can follow and detect each touch position C.

The movement state calculation unit 12 calculates states of movement of a touch position C in a direction of the X-axis and a direction of the Y-axis from a plurality of touch positions C that are temporally continuous and input from the detection unit 11. Specifically, for example, the movement state calculation unit 12 calculates a movement vector from a plurality of touch positions C that are input from the detection unit 11, with a predetermined period of time, and calculates an amount of movement of a component in each of a direction of the X-axis and a direction of the Y-axis from the calculated movement vector.

The movement state calculation unit 12 outputs the calculated amount of movement of a touch position C to the vibration control unit 13 and the input operation determination unit 15. The movement state calculation unit 12 outputs coordinates of a touch position C that is an initial point of a movement vector (that will be described as "initial coordinates", below) to the vibration control unit 13.

The vibration control unit 13 controls a vibration mode of the vibration unit 30 based on amounts of movement of a touch position C in a direction of the X-axis and a direction of the Y-axis that are input from the movement state calculation unit 12. The vibration control unit 13 includes an interval control unit 13a and an intensity control unit 13b.

The interval control unit 13a controls a generation interval of vibration of the vibration unit 30 based on an amount of movement of a touch position C in a direction of the X-axis. For example, the interval control unit 13a controls an on/off interval of vibration of the vibration unit 30 (for example, an on/off ratio of vibration of the vibration element (s) 31) based on an amount of movement of a touch position C in a direction of the X-axis, so that a generation interval of vibration thereof is controlled. In a case where vibration of the vibration unit 30 is turned off, a vibration intensity is "0".

The intensity control unit 13b controls a vibration intensity of the vibration unit 30 based on an amount of movement of a touch position C in a direction of the Y-axis. Herein, for example, the intensity control unit 13b adjusts a driving voltage for driving the vibration element(s) 31 that is/are included in the vibration unit 30, based on an amount of movement of a touch position C in a direction of the Y-axis, so that a vibration intensity thereof is controlled.

Figure 3A:
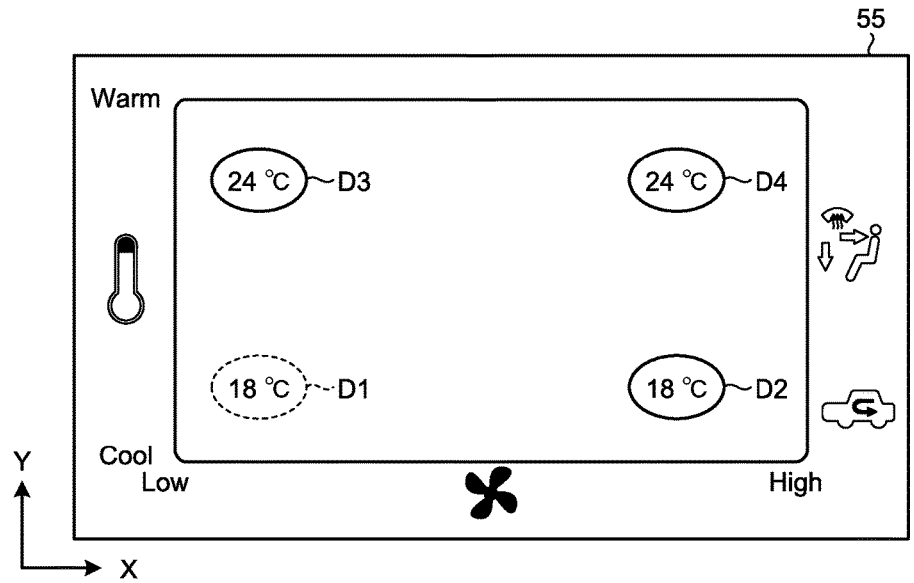
FIG. 3A is a diagram illustrating an example (part 1) of a display image that is displayed on a display.
Figure 3B:
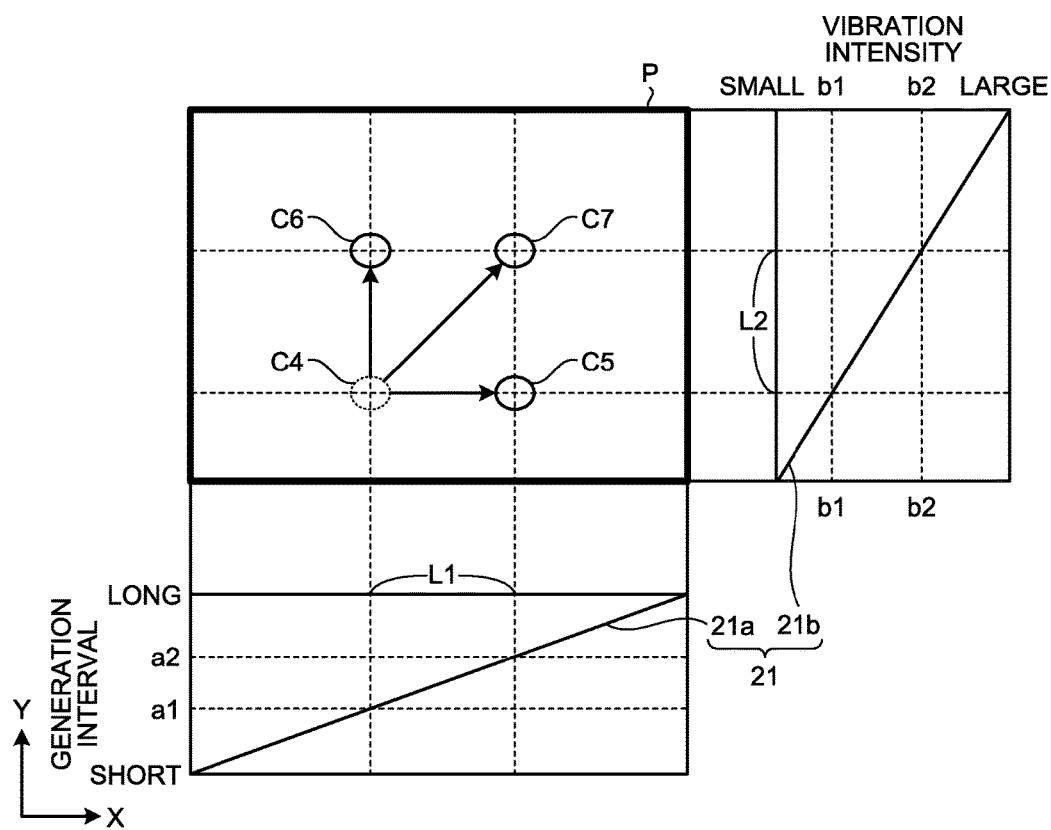
FIG. 3B is a diagram illustrating an example (part 1) of a control process to be executed by a vibration control unit.

Herein, a detail of a control process of the vibration control unit 13 will be described by using FIG. 3A and FIG. 3B. FIG. 3A is a diagram illustrating an example of a display image that is displayed on the display 55. FIG. 3B is a diagram illustrating an example of a control process of the vibration control unit 13. FIG. 3A and FIG. 3B illustrate a case where a user adjusts temperature and air volume of an air conditioner of the on-vehicle apparatus 50 by the input device 1.

As illustrated in FIG. 3A, an image that indicates a current operation state of an air conditioner is displayed on the display 55 of the on-vehicle apparatus 50. Such an image is arranged in such a manner that a user is capable of being in visual contact with a current operation state depending on a display position thereof. An example as illustrated in FIG. 3A indicates that air volume to be set is increased with increasing an X-coordinate of a display position of such an image, and indicates that set temperature to be set is increased with increasing a Y-coordinate thereof.

Current set temperature is also indicated by characters that indicate the set temperature. Such an image is updated depending on amounts of movement of a touch position C on the operation surface P in a direction of the X-axis and a direction of the Y-axis that are input from the movement state calculation unit 12.

As illustrated in FIG. 3B, the operation surface P is associated with a control value of a vibration mode of the vibration unit 30 that is dependent on coordinates of a touch position C, as vibration information 21. The vibration information 21 includes vibration information 21*a* that is a control value with respect to a generation interval of vibration and a direction of the X-axis, and vibration information 21*b* that is a control value with respect to a vibration intensity and a direction of the Y-axis.

In an example as illustrated in FIG. 3B, the vibration information 21*a* is a function such that a generation interval of vibration and a coordinate in a direction of the X-axis are in a proportional relationship, and is set in such a manner that a generation interval of vibration is increased with increasing a coordinate in a direction of the X-axis. The vibration information 21*b* is a function such that a vibration intensity and a coordinate in a direction of the Y-axis are in a proportional relationship, and is set in such a manner that a vibration intensity is increased with increasing a coordinate in a direction of the Y-axis.

For example, in a case where a user touches the operation surface P at a touch position C4, a vibration mode of the vibration unit 30 is controlled in such a manner that the interval control unit 13*a* sets a generation interval of vibration at a generation interval a1 and the intensity control unit 13*b* sets a vibration intensity at a vibration intensity b1.

For example, in a case where a user moves his or her finger from the touch position C4 to a touch position C5 on the operation surface P in a direction of the X-axis as illustrated in FIG. 3B, the movement state calculation unit 12, first, calculates an amount of movement L1 from the touch position C4 to the touch position C5, and outputs such an amount of movement L1 and the touch position C4 as initial coordinates to the vibration control unit 13. Such an amount of movement L1 is also output to an on-vehicle apparatus control unit 51.

The interval control unit 13*a* of the vibration control unit 13 controls a generation interval of vibration to be caused by the vibration unit 30 based on coordinates of the touch position C4, the amount of movement L1, and the vibration information 21*a*.

Specifically, the interval control unit 13*a* controls a vibration mode of the vibration unit 30 with reference to the vibration information 21*a* in such a manner that a generation interval is a generation interval a2 that corresponds to the touch position C5 provided by executing movement from the touch position C4 in a direction of the X-axis by the amount of movement L1.

In an example as illustrated in FIG. 3B, the generation interval a2 is greater than the generation interval a1. That is, in such a case, the interval control unit 13*a* controls the vibration unit 30 in such a manner that a generation interval is increased with increasing an amount of movement of a touch position C in a direction of the X-axis.

For example, in a case where the vibration unit 30 generates vibration, friction force on the operation surface P is reduced to provide a user with a smooth sense of touch. On the other hand, in a case where the vibration unit 30 does not generate vibration, friction force on the operation surface P is not reduced to provide natural friction force on the operation surface P, and, for example, a user is provided with a non-smooth sense of touch. As the operation surface P switches between a smooth sense of touch and a non-smooth sense of touch, a user can be provided with a sense of touch as if irregularities were present on the operation surface P.

That is, the interval control unit 13*a* controls a generation interval of vibration of the vibration unit 30 to control spacing of irregularities in the sense of touch as described above. In an example as illustrated in FIG. 3B, spacing of irregularities on the operation surface P is increased with increasing an amount of movement of a touch position C in a direction of the X-axis.

Thus, the interval control unit 13*a* controls a generation interval of vibration of the vibration unit 30 depending on an amount of movement of a touch position C in a direction of the X-axis to control spacing of irregularities in a sense of touch to the operation surface P. Therefore, a user can recognize an amount of movement of a touch position C on the operation surface P in a direction of the X-axis based on a change in spacing of irregularities in a sense of touch to the operation surface P. In such a case, a coordinate of a touch position C in a direction of the Y-axis is not changed, and hence, a vibration intensity is constant.

Next, for example, a case will be described where a user moves his or her finger from the touch position C4 to a touch position C6 on the operation surface P in a direction of the Y-axis as illustrated in FIG. 3B. As a user moves his or her finger from the touch position C4 to the touch position C6, the movement state calculation unit 12, first, calculates an amount of movement L2 from the touch position C4 to the touch position C6, and outputs the amount of movement L2 and the touch position C4 as initial coordinates to the vibration control unit 13. The amount of movement L2 is also output to the on-vehicle apparatus control unit 51.

The intensity control unit 13*b* of the vibration control unit 13 controls a vibration intensity to be caused by the vibration unit 30 based on coordinates of the touch position C4, the amount of movement L2, and the vibration information 21*b*.

Specifically, the intensity control unit 13*b* controls a vibration mode of the vibration unit 30 with reference to the vibration information 21*b* in such a manner that a vibration intensity is a vibration intensity b2 that corresponds to the touch position C6 provided by executing movement from the touch position C4 in a direction of the Y-axis by the amount of movement L2.

In an example as illustrated in FIG. 3B, the vibration intensity b2 is greater than the vibration intensity b1. That is, in such a case, the intensity control unit 13*b* controls a vibration mode of the vibration unit 30 in such a manner that a vibration intensity is increased with increasing an amount of movement of a touch position C in a direction of the Y-axis.

For example, friction force on the operation surface P is decreased with increasing a vibration intensity. Therefore, a user obtains a smoother sense of touch to the operation surface P as a vibration intensity is increased. In such a case, an amount of movement of a touch position C in a direction of the X-axis is "0", and hence, the interval control unit 13a constantly controls the vibration unit 30 at the generation interval a1.

Herein, a difference in friction force on the operation surface P between a case where the vibration unit 30 is vibrated and a case where it is not vibrated is increased depending on a vibration intensity in the case where it is vibrated. Therefore, as an amount of movement of a touch position C in a direction of the Y-axis is increased, a user is provided with a sense of touch as if greater irregularities were present on the operation surface P.

Thus, the intensity control unit 13b controls a vibration intensity of the vibration unit 30 depending on an amount of movement of a touch position C in a direction of the Y-axis to control heights of irregularities in a sense of touch to the operation surface P that is provided to a user. Therefore, a user can recognize an amount of movement of a touch position C on the operation surface P in a direction of the Y-axis based on a change in heights of irregularities in a sense of touch to the operation surface P.

Thus, the vibration control unit 13 changes a vibration mode of the vibration unit 30 depending on amounts of movement of a touch position C in a direction of the X-axis and a direction of the Y-axis, so that a user can intuitively recognize a direction of an operation on the operation surface P. Therefore, the input device 1 can improve user operability thereof.

The direction of the X-axis and the direction of the Y-axis as described above are associated with operation instructions with mutually different contents. For example, for such operation instructions, an operation instruction for air volume of an air conditioner is set in a direction of the X-axis and an operation instruction for temperature of the air conditioner is set in a direction of the Y-axis. Thereby, the on-vehicle apparatus control unit 51 can set air volume and temperature of an air conditioner depending on amounts of movement of a touch position C in a direction of the X-axis and a direction of the Y-axis that are input from the movement state calculation unit 12.

When a user desires an increase in air volume, his or her finger is moved from the touch position C4 to the touch position C5. In such a case, the on-vehicle apparatus control unit 51 is provided with an amount of movement L1 of a touch position C in a direction of the X-axis that is input from the movement state calculation unit 12, then sets air volume of an air conditioner depending on such an amount of movement L1, and updates an image that is displayed on the display 55.

In an example as illustrated in FIG. 3A, the on-vehicle apparatus control unit 51 changes a setting of an air conditioner from lower air volume to a higher one, and updates and displays an image that indicates an operation state and is displayed on the display 55 in such a manner that current air volume of the air conditioner is changed to that of a display position D2 that corresponds to the higher one.

When a user desires an increase in set temperature, his or her finger is moved from the touch position C4 to the touch position C6. In such a case, the on-vehicle apparatus control unit 51 is provided with an amount of movement L2 from the touch position C4 to the touch position C6 that is input from the movement state calculation unit 12, then sets set temperature of an air conditioner depending on such an amount of movement L2, and updates an image that is displayed on the display 55.

Specifically, the on-vehicle apparatus control unit 51 changes a setting of set temperature of an air conditioner from 18° C. to 24° C. The on-vehicle apparatus control unit 51 moves an image that indicates a current operation state and is displayed on the display 55 from a display position D1 to a display position D3, and updates a display image at the display position D3 to provide a representation of 24° C.

As described above, control of a vibration mode of the vibration unit 30 to be executed by the vibration control unit 13 and each setting process for an air conditioner to be executed by the on-vehicle apparatus control unit 51 are executed in parallel. Thereby, a user can intuitively recognize operation content for an air conditioner based on spacing or heights of irregularities in a sense of touch to the operation surface P, without being in visual contact with the display 55 or the operation surface P. Therefore, user operability can be improved.

The on-vehicle apparatus control unit 51 can also output air volume or set temperature after setting as a sound from the speakers 56. Such a sound is, for example, an audio guidance of "air volume of an air conditioner has been set at a higher one" or "set temperature has been set at 24° C.". Thus, an audio guidance is used together, so that a user can also recognize operation content by a synergistic effect of a sense of touch or a sense of vision and a sense of hearing. Thereby, user operability can be improved.

For example, in a case where a touch position C is moved from the touch position C4 to a touch position C7 as illustrated in FIG. 3B, the movement state calculation unit 12 calculates an amount of movement L1 and an amount of movement L2 of a touch position C in a direction of the X-axis and a direction of the Y-axis, respectively, and outputs the calculated amounts of movement L1 and L2 to the on-vehicle apparatus control unit 51. The movement state calculation unit 12 outputs the touch position C4 as initial coordinates to the vibration control unit 13.

In such a case, the vibration control unit 13 executes, in parallel, a control process of the interval control unit 13a to change a generation interval of vibration from the generation interval a1 to the generation interval a2, and a control process of the intensity control unit 13b to change a vibration intensity from the vibration intensity b1 to the vibration intensity b2, as described above. Therefore, as a touch position C approaches the touch position C7, the vibration control unit 13 provides a user with a sense of touch in such a manner that spacing of irregularities in the sense of touch is increased and heights of the irregularities in the sense of touch are increased.

The on-vehicle apparatus control unit 51 executes a process for changing a setting of an air conditioner from lower air volume to a higher one and changing a setting of set temperature from 18° C. to 24° C., based on the amounts of movement L1 and L2, then moves an image that indicates a current operation state and is displayed on the display 55 from the display position D1 to the display position D4, and updates a display image at the display position D4 to provide a representation of 24° C.

Thus, the input device 1 can simultaneously set air volume and temperature of an air conditioner. In such a case, a user can be provided with a sense of touch that corresponds to air volume and temperature. Therefore, a user can readily adjust both air volume and temperature by a single operation for the input device 1 and obtain a sense of touch that corresponds to such an operation, so that operation content can be recognized intuitively. Thereby, the input device 1 can improve user operability thereof.

In a state where a finger of a user contacts the operation surface P and in a case where it is moved from the touch position C7 to the touch position C4, the movement state calculation unit 12, for example, calculates amounts of movement of a touch position C in a direction of the X-axis and a direction of the Y-axis as amounts of movement "−L1" and "−L2", respectively, and outputs the calculated amounts of movement "−L1" and "−L2" to the on-vehicle apparatus control unit 51. The movement state calculation unit 12 outputs the touch position C7 as initial coordinates to the vibration control unit 13.

The interval control unit 13a of the vibration control unit 13 controls a vibration mode of the vibration unit 30 with reference to the vibration information 21a in such a manner that a generation interval is the generation interval a1 that corresponds to the touch position C6 provided by executing movement from the touch position C7 in a direction of the X-axis by the amount of movement −L1.

The intensity control unit 13b controls a vibration mode of the vibration unit 30 with reference to the vibration information 21b in such a manner that a vibration intensity is the vibration intensity b1 that corresponds to the touch position C5 provided by executing movement from the touch position C7 in a direction of the Y-axis by the amount of movement −L2. Thus, in a case where a touch position C moves in negative directions among directions of the X-axis and directions of the Y-axis, a user can recognize a sense of touch to the operation surface P in such a manner that spacing of irregularities is decreased or heights of the irregularities are decreased.

In such a case, the on-vehicle apparatus control unit 51 executes setting of an air conditioner in such a manner that air volume and set temperature thereof are decreased, depending on the amounts of movement "−L1" and "−L2", as compared to before the amounts of movement are input, and updates an image that is displayed on the display 55, so as to provide an image with a result of setting of the air conditioner being reflected therein.

In the example as described above, a case where the vibration information 21 illustrated in FIG. 3B is such that coordinates of a touch position C and at least one of a generation interval and a vibration intensity are in a proportional relationship has been illustrated and this is not limiting. That is, for the vibration information 21, an exponential function of coordinates of a touch position C or a function of division or the like in combination therewith may be used. For the vibration information 21, a table or a map with coordinates of a touch position C and at least one of a generation interval and a vibration intensity being associated with one another may be used.

A case where at least one of a generation interval of vibration and a vibration intensity of the vibration unit 30 is changed based on an amount of movement of a touch position C has been illustrated herein, and this is not limiting. That is, for example, the vibration control unit 13 may execute control so as to increase an vibration intensity based on an amount of movement of a touch position C in a direction of the X-axis and execute control so as to decrease the vibration intensity based on an amount of movement of the touch position C in a direction of the Y-axis, while a generation interval of vibration is constant.

The vibration control unit 13 need not necessarily change a vibration mode depending on an amount of movement of a touch position C. That is, the vibration control unit 13 can also control a vibration mode of the vibration unit 30 depending on a direction of movement of a touch position C. For example, the vibration control unit 13 can also execute control so as to increase an interval of vibration in a case where a touch position C moves in a direction of the X-axis and execute control so as to decrease the interval of vibration in a case where it moves in a direction of the Y-axis as compared with a case where it moves in the direction of the X-axis, in a state where a vibration intensity is fixed at a constant value. Other than those described above, for example, the vibration control unit 13 can also execute control so as to increase a vibration intensity in a case where a touch position C moves in a direction of the X-axis and execute control so as to decrease the vibration intensity in a case where it moves in a direction of the Y-axis as compared with a case where it moves in the direction of the X-axis, in a state where an interval of vibration is fixed at a constant value. Thus, the vibration control unit 13 controls the vibration unit 30 depending on a direction of movement of a touch position C, so that a user can recognize a direction of movement of the touch position C based on a difference between generation intervals of vibration or intensities of vibration.

In the example as illustrated in FIG. 3A and FIG. 3B, a case where operation instructions are provided for an air conditioner that is an instrument common to the first direction (direction of the X-axis) and the second direction (direction of the Y-axis) has been illustrated and this is not limiting. That is, operation instructions for the first direction and the second direction may be provided for, for example, a volume level, a reproducing position, or the like of an audio device, a video, or the like.

In such a case, operation instructions for the first direction and the second direction need not necessarily be for an identical operation instrument. That is, for example, it is also possible to set an operation instruction for set temperature of an air conditioner in the first direction and set an operation instruction for setting a volume level of an audio device in the second direction.

However, for an operation instruction in the first direction and an operation instruction in the second direction, it is preferable to set interacting functions such as "air volume and set temperature of an air conditioner" or "air volume of an air conditioner and a volume level of an audio device" as described above. This is because, for example, a user readily executes operations for setting air volume of an air conditioner and the like while a balance between interacting functions is taken into consideration.

Herein, a configuration of the input device 1 will continue to be described by returning to FIG. 2. The input operation determination unit 15 determines whether or not an input operation of a user that is executed on the operation surface P is a gesture operation. In detail, the input operation determination unit 15 determines whether or not an input operation is a predetermined gesture operation, based on a touch position C that is input from the detection unit 11, a state of movement of the touch position C that is input from the movement state calculation unit 12, and gesture information 22 that is preliminarily stored in the storage unit 20.

The storage unit 20 is a storage unit that is composed of a storage device such as a non-volatile memory or a hard disk drive, and stores the vibration information 21 and the gesture information 22.

Herein, the gesture information 22 stored in the storage unit 20 will be described by using FIG. 4. FIG. 4 is a diagram illustrating a specific example of the gesture information 22. As illustrated in FIG. 4, the gesture information 22 includes information with a "target device", a "gesture operation", and a "function" associated with one another.

The target device indicates an instrument of the on-vehicle apparatus 50 that is a control target for the input device 1. The gesture operation indicates a predetermined gesture. The function means a function that is a control target for the target device.

In an example as illustrated in FIG. 4, in a case where a user executes a slide operation that draws a circle on the operation surface P, that is, in a case where a touch position C that is input from the detection unit 11 describes a trajectory so as to draw a "circle", the input operation determination unit 15 recognizes such an operation as that of a "circle".

An input operation of a "circle" as described above is stored as a "gesture operation" in the gesture information 22, and hence, in such a case, the input operation determination unit 15 determines that an input operation is a gesture operation.

The input operation determination unit 15 extracts an "air conditioner" as a target device and "wind direction adjustment" as a function from the gesture information 22, and outputs a signal that indicates such an extracted target device and function to the vibration control unit 13 and the on-vehicle apparatus 50.

In a case where a touch position C describes a trajectory that corresponds to a gesture operation, the vibration control unit 13 can also control the vibration unit 30 so as to provide a unique vibration mode that corresponds to the gesture operation. For example, in a case where a user executes a gesture operation of a "circle", the input operation determination unit 15 estimates that a trajectory of a touch position C is a gesture operation that corresponds to a "circle" at a stage where detection has been executed in such a manner that the trajectory of the touch position C is gradually changed to be "vertical"→"diagonal"→"horizontal", and outputs such a result of estimation to the vibration control unit 13.

In a case where a user executes a gesture operation of a "triangle", the input operation determination unit 15 estimates that a trajectory of a touch position C is a gesture operation that corresponds to a "triangle" at a stage where detection has been executed in such a manner that the trajectory of the touch position C is discretely changed to be "diagonal"→"horizontal"→"diagonal", and outputs such a result of estimation to the vibration control unit 13.

The vibration control unit 13 is provided with the result of estimation as described above that is input from the input operation determination unit 15, and then, controls the vibration unit 30 so as to provide a unique vibration mode that corresponds to a gesture operation as the result of estimation. It is preferable for such a unique vibration mode to be a vibration mode different from vibration modes that are associated with a direction of the X-axis and a direction of the Y-axis. Thereby, for a subsequent gesture operation, a user is provided with a sense of touch that is unique to such a gesture. Therefore, a user can recognize that the input device 1 recognizes a gesture operation, through a sense of touch to the operation surface P.

Although FIG. 4 illustrates a case where a gesture operation is of a "circle" or a "triangle", a gesture operation may be an operation to draw another shape such as a "quadrangle" or an "infinity sign (∞)".

Figure 5A:
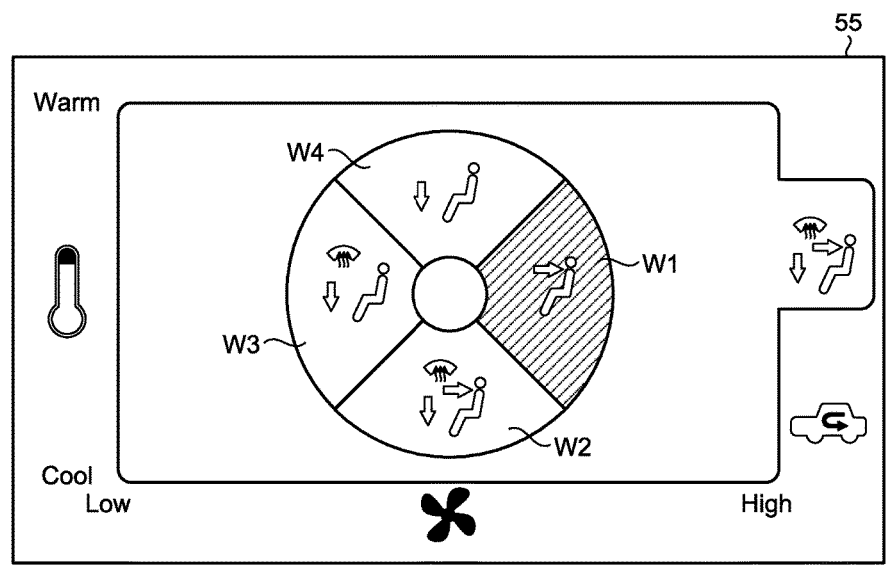
FIG. 5A is a diagram illustrating an example (part 2) of a display image that is displayed on a display.
Figure 5B:
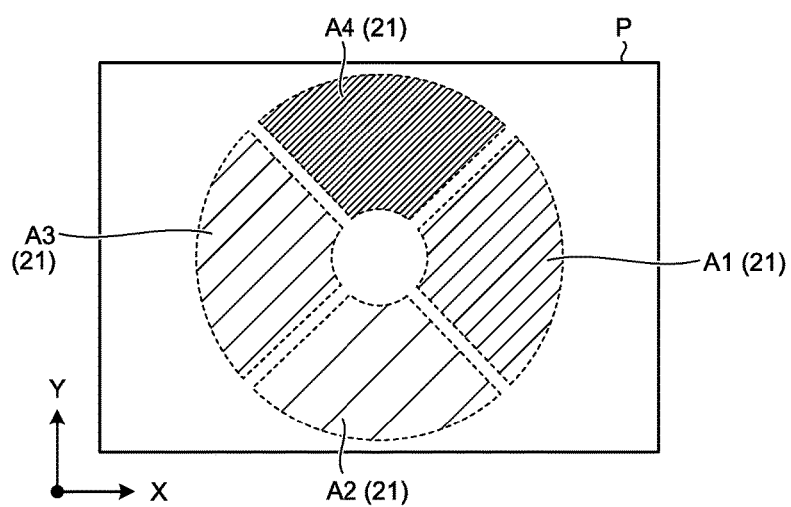
FIG. 5B is a diagram illustrating an example (part 2) of a control process to be executed by a vibration control unit.

Herein, processes to be executed by the input device 1 and the on-vehicle apparatus control unit 51 in a case where a control target for the input device 1 is a setting of a wind direction of an air conditioner will be described by using FIG. 5A and FIG. 5B. FIG. 5A is a diagram illustrating an example of a display screen that is displayed on the display 55. FIG. 5B is a diagram illustrating an example of a control process to be executed by the vibration control unit 13.

As illustrated in FIG. 5A, the on-vehicle apparatus control unit 51 is provided with a signal indicating that a control target is a setting of a wind direction of an air conditioner that is input through the input operation determination unit 15, and then, causes the display 55 to display a display image of the setting of a wind direction of an air conditioner. In such a display image, for example, four wind directions settable for an air conditioner are displayed. An image of a wind direction that is set currently may be displayed in such a manner that a color different from those of the other wind directions is superimposed thereon so that a user is capable of being visual contact therewith.

The on-vehicle apparatus control unit 51 sets such a wind direction of an air conditioner depending on a touch position C that is input from the control unit 10. For example, in a case where such a touch position C is provided in an area A1, A2, A3, or A4 as illustrated in FIG. 5B, a wind direction is set so as to provide a wind direction W1, W2, W3, or W4 that corresponds to a position of such an area A1, A2, A3, or A4.

For example, in a case where a touch position C is included in the area A1, the on-vehicle apparatus control unit 51 sets a wind direction at W1, and superimposes and displays a color on an image of the wind direction W1 that is displayed on the display 55. In a case where a touch position C is provided in an area other than the areas A1 to A4, the on-vehicle apparatus control unit 51 may, for example, disable the touch position C and change no wind direction.

On the other hand, the vibration control unit 13 is provided with a signal indicating that a control target is a setting of air volume of an air conditioner that is input from the input operation determination unit 15, and then, acquires the vibration information 21 for a setting of air volume of the air conditioner that is stored in the storage unit 20.

The vibration information 21 for a setting of air volume of an air conditioner will be described with reference to FIG. 5B. In FIG. 5B, for the sake of convenience of understanding, the vibration information 21 that corresponds to the areas A1 to A4 as described above is indicated by oblique lines on the operation surface P. A difference between kinds of the oblique lines indicates that vibration modes as described later are different.

As illustrated in FIG. 5B, the vibration information 21 for a setting of air volume of an air conditioner is information for a vibration mode of the vibration unit 30 with respect to each of the areas A1 to A4 and an area other than the areas A1 to A4 on the operation surface P. In such a case, the vibration control unit 13 controls a vibration mode of the vibration unit 30 based on the vibration information 21 for a setting of air volume of an air conditioner.

Specifically, for example, in a case where a touch position C is provided in the area A1, A2, A3, or A4, the vibration control unit 13 acquires the touch position C, and then, the intensity control unit 13b of the vibration control unit 13 controls a vibration mode of the vibration unit 30 so as to provide one of intensities of vibration that are mutually different among the areas A1 to A4.

In a case where a touch position C is provided in another area, the vibration control unit 13 acquires the touch position C, and then, for example, does not vibrate the vibration unit 30. In such a case, friction force on the operation surface P is relatively increased as compared with those of the areas A1 to A4. Therefore, for example, in a case where the on-vehicle apparatus control unit 51 is set to disable a touch position C at a time when the touch position C is provided in another area, it is possible for a user to recognize that an input operation is disabled, through an increase in friction force.

In a case where a user executes an input operation to draw a triangle on the operation surface P, that is, in a case where a touch position C that is input from the detection unit 11 describes a trajectory so as to draw a "triangle", the input operation determination unit 15 recognizes such an operation as that of a "triangle".

An input operation of a "triangle" as described above is stored as a "gesture operation" in the gesture information 22 as illustrated in FIG. 4, and hence, the input operation determination unit 15 determines that an input operation of a user is a gesture operation.

The input operation determination unit 15 extracts an "air conditioner" as a target device and "temperature/air volume adjustment" as a function that correspond to a triangle, from the gesture information 22, and outputs such an extracted target device and function to the vibration control unit 13 and the on-vehicle apparatus control unit 51. Thereby, the vibration control unit 13 and the on-vehicle apparatus control unit 51 set a control target at adjustment of temperature/air volume of an air conditioner that have already been described for FIG. 3A and FIG. 3B.

Thus, a user can change a control target for the input device 1 or operation content for the control target by a simple gesture operation. Therefore, a user learns such a gesture operation so that a desired target device or function can readily be called, and hence, user operability can be improved.

The gesture information 22 as illustrated in FIG. 4 is an example, and can appropriately be changed depending on usage by a user, an instrument to be connected, or the like.

By returning to a description for FIG. 2, the sound control unit 16 causes the speakers 56 of the on-vehicle apparatus 50 to output a sound dependent on a vibration mode of the vibration unit 30. First, the sound control unit 16 acquires, for example, information of a current vibration mode of the vibration unit 30 from the vibration control unit 13. Such information of a vibration mode includes information for a generation interval of vibration and a vibration intensity.

Then, the sound control unit 16 causes the speakers 56 to output, for example, a sound effect of a "click" at timing when the vibration unit 30 is turned on to off, that is, timing when a sense of touch to the operation surface P that is provided to a user turns from a peak to a valley, based on a generation interval of vibration of the vibration unit 30. Thus, the sound control unit 16 outputs a sound effect of a "click" at timing when it turns to a valley, so that a user can be provided with a sound effect that corresponds to a sense of touch.

Herein, the sound control unit 16 controls a volume level of such a sound effect that is output from the speakers 56, based on a vibration intensity of the vibration unit 30. In such a case, the sound control unit 16 executes control in such a manner that a volume level of a sound effect increases with increasing a vibration intensity of the vibration unit 30.

Thus, the sound control unit 16 causes the speakers 56 to output a sound dependent on a vibration mode of the vibration unit 30 and provide a user with feedback of an sound effect dependent on a sense of touch that is provided to a user, so that a user can recognize operation content not only through a sense of touch but also through a sense of hearing. Thereby, user operability can be improved.

In a case where the input device 1 includes a sound output unit, the sound control unit 16 can also cause such a sound output unit to output the sound effect as described above. The sound effect as described above is an example and is appropriately changeable. A sound effect need not necessarily correspond to a sound of touch. For example, the sound control unit 16 may continuously change a frequency or a volume level of a sound effect depending on a direction of movement of a touch position C so as to cause a user to recognize a direction of movement or an amount of direction of the touch position C. Alternatively, the sound control unit 16 may be to output a sound effect that differs from one direction of movement of a touch position C to another.

In an example as illustrated in FIG. 2, the input device 1 and the on-vehicle apparatus 50 have been described separately, and this is not limiting, wherein, for example, the input device 1 and the on-vehicle apparatus control unit 51 and the display 55 of the on-vehicle apparatus 50 may be configured as a display device 100. In such a case, the display device 100 can provide a user with an operational feeling that uses a sense of touch in addition to a sense of vision.

Next, steps of a process that is executed by the input device 1 according to the present embodiment will be described by using FIG. 6. FIG. 6 is a flowchart illustrating an example of steps of a process that is executed by the input device 1 according to the present embodiment, and the process is to be repeatedly executed by the control unit 10 of the input device 1.

As illustrated in FIG. 6, the detection unit 11 of the input device 1 detects a touch position C on the operation surface P (step S101). Then, the movement state calculation unit 12 calculates amounts of movement of the touch position C in a direction of the X-axis and a direction of the Y-axis (step S102).

Subsequently, the interval control unit 13a of the vibration control unit 13 controls a generation interval of vibration depending on the amount of movement of the touch position C in the direction of the X-axis (step S103).

Furthermore, the intensity control unit 13b of the vibration control unit 13 controls a vibration intensity depending on the amount of movement of the touch position C in the direction of the Y-axis (step S104). Processes at steps S103 and S104 are executed in parallel and this is not limiting Then, the sound control unit 16 acquires a current vibration mode of the vibration unit 30 from the vibration control unit 13, causes a sound output unit (the speakers 56 of the on-vehicle apparatus 50) to output a sound dependent on such a vibration mode of the vibration unit 30 (step S105), and ends the process. A process at step S105 is executed in parallel with vibration control processes at step S103 and step S104, and this is not limiting.

Figure 7:
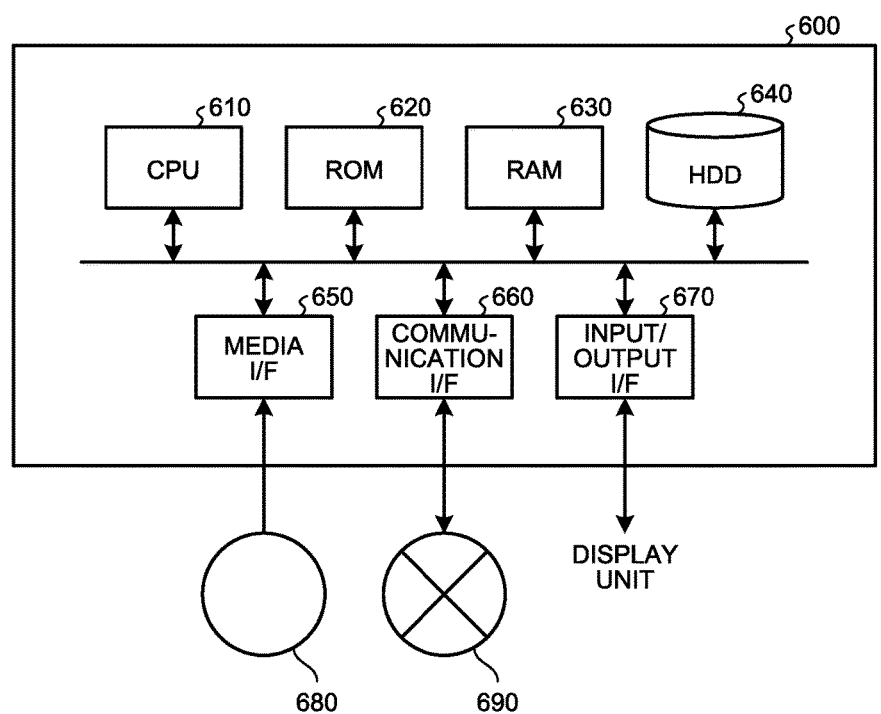
FIG. 7 is a hardware configuration diagram illustrating an example of a computer that realizes a function of an input device according to the present embodiment.

The input device 1 according to the present embodiment can be realized by a computer 600 with a configuration that is illustrated as an example in FIG. 7. FIG. 7 is a hardware configuration diagram illustrating an example of a computer that realizes a function of the input device 1.

The computer 600 includes a Central Processing Unit (CPU) 610, a Read Only Memory (ROM) 620, a Random Access Memory (RAM) 630, and a Hard Disk Drive (HDD) 640. The computer 600 includes a media interface (I/F) 650, a communication interface (I/F) 660, and an input/output interface (I/F) 670.

The computer 600 includes a Solid State Drive (SSD), and such an SSD may execute a part or all of functions of the HDD 640. An SSD may be provided instead of the HDD 640.

The CPU 610 operates based on a program that is stored in at least one of the ROM 620 and the HDD 640, and executes control of each unit. The ROM 620 stores a boot program that is executed by the CPU 610 at a time of a start of the computer 600, a program dependent on hardware of the computer 600, and the like. The HDD 640 stores a program that is executed by the CPU 610, data that are used by such a program, and the like.

The media I/F 650 reads a program or data stored in a storage medium 680 and provides it or them to the CPU 610 through the RAM 630. The CPU 610 loads such a program from the storage medium 680 onto the RAM 630 through the media I/F 650, and executes the loaded program. Alternatively, the CPU 610 uses such data to execute a program. The storage medium 680 is, for example, a magnetooptical recording medium such as a Digital Versatile Disc (DVD), an SD card, a USB flash drive, or the like.

The communication I/F 660 receives data from another instrument through a network 690 and sends them to the CPU 610, and transmits data generated by the CPU 610 to another instrument through the network 690. Alternatively, the communication I/F 660 receives a program from another instrument through the network 690 and sends it to the CPU 610, and the CPU 610 executes such a program.

The CPU 610 controls a display unit such as a non-illustrated display, an output unit such as a speaker, and a input unit such as a keyboard, a mouse, or a button, through the input/output I/F 670. The CPU 610 acquires data from the input unit through the input/output I/F 670. The CPU 610 outputs generated data to the display unit or the output unit through the input/output I/F 670.

For example, in a case where the computer 600 functions as the input device 1, the CPU 610 of the computer 600 executes a program loaded on the RAM 630 to realize each of functions of the detection unit 11, the movement state calculation unit 12, the vibration control unit 13, the input operation determination unit 15, and the sound control unit 16.

For example, the CPU 610 of the computer 600 reads such a program from the storage medium 680 and executes it, and as another example, such a program may be acquired from another device through the network 690. The HDD 640 can store information that is stored in the storage unit 20.

As has been described above, the input device 1 according to the present embodiment includes the detection unit 11, the vibration unit 30, and the vibration control unit 13. The detection unit 11 detects a touch position C on the operation surface P. The vibration unit 30 vibrates the operation surface P. The vibration control unit 13 controls the vibration unit 30 to provide different vibration modes between a case where a direction of movement of a touch position C is a first direction defined on the operation surface P and a case where it is a second direction different from the first direction. Thereby, the input device 1 according to the present embodiment can improve user operability thereof.

In the embodiment as has been described above, a case where the vibration control unit 13 controls a vibration mode of the vibration unit 30 based on a touch position C on the operation surface P has been illustrated and this is not limiting. That is, the vibration control unit 13 can also control a vibration mode of the vibration unit 30 based on an image displayed on the display 55.

Figure 8:
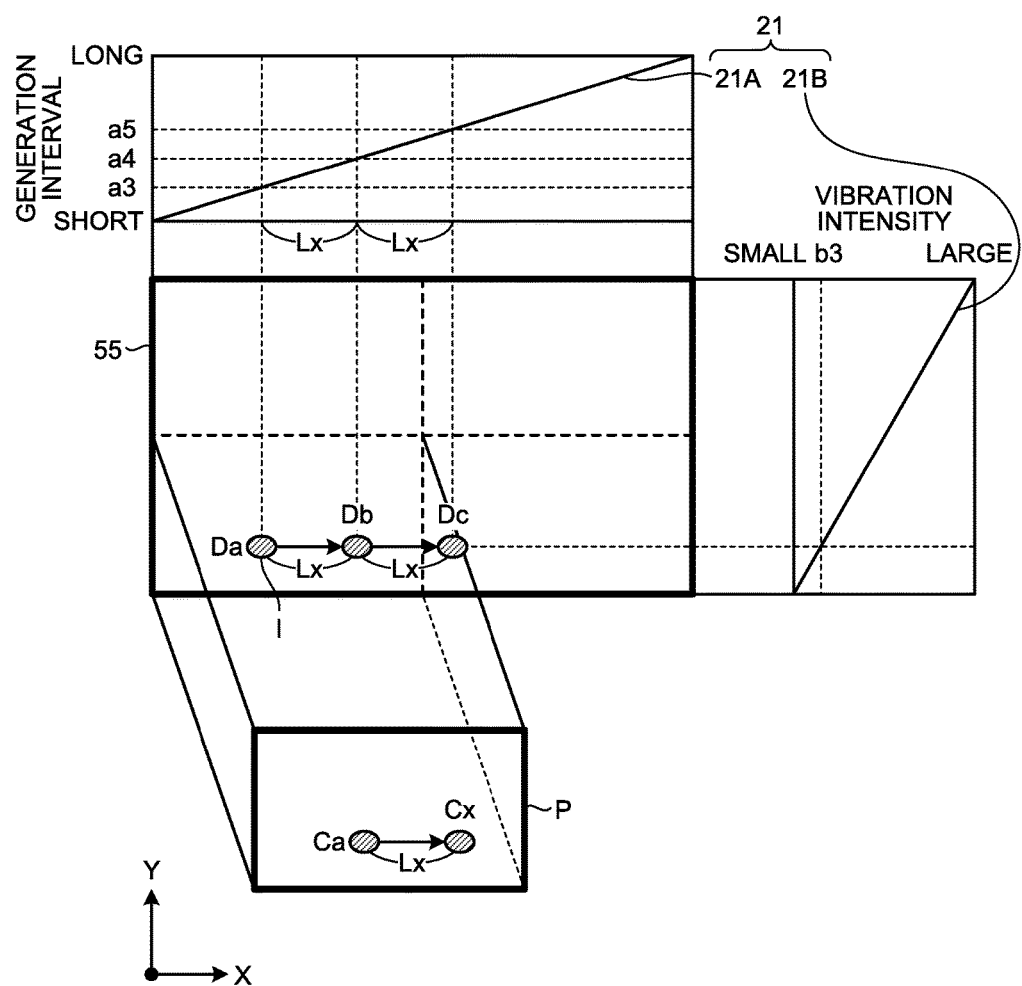
FIG. 8 is a diagram for illustrating a variation according to the present embodiment.

A variation for controlling a vibration mode based on an image on the display 55 will be described by using FIG. 8. FIG. 8 is a diagram for illustrating the input device 1 according to a variation. In a variation as illustrated below, a case will be described where control is executed in such a manner that absolute values of a direction of movement and an amount of movement of a touch position C on the operation surface P and absolute values of a direction of movement and an amount of movement of a cursor I that is displayed on the display 55 are identical to one another.

Although a control value for the vibration unit 30 is associated with a touch position C on the operation surface P in the vibration information 21 in the embodiment described above, a control value for the vibration unit 30 is associated with a display position on the display 55 in the vibration information 21 in the variation as illustrated in FIG. 8. The vibration information 21 includes vibration information 21A that is a control value for a generation interval of vibration and a direction of the X-axis, and vibration information 21B that is a control value for a vibration intensity and a direction of the Y-axis.

In a display image displayed on the display 55, for example, a cursor I that indicates a current operation position is displayed at a display position Da. The display 55 is divided into, for example, four areas. Herein, a description will be provided in such a manner that a lower left area among such divided areas corresponds to one area on the operation surface P.

For example, in a case where a touch position C moves from a touch position Ca to a touch position Cx on the operation surface P in a direction of the X-axis, the movement state calculation unit 12 calculates an amount of movement Lx of the touch position C from the touch position Ca to the touch position Cx and outputs the amount of movement Lx to the on-vehicle apparatus control unit 51 and the vibration control unit 13. The movement state calculation unit 12 outputs the display position Da as initial coordinates to the vibration control unit 13.

The vibration information 21 is associated with a display position of a cursor I on the display 55, and hence, the vibration control unit 13 controls a vibration mode of the vibration unit 30 based on the display position Da, the amount of movement Lx, and the vibration information 21. Specifically, first, the vibration control unit 13 acquires the amount of movement Lx and the display position Da of a touch position C from the movement state calculation unit 12, and the vibration information 21A and the vibration information 21B as the vibration information 21 from the storage unit 20.

Subsequently, the vibration control unit 13 controls a vibration mode of the vibration unit 30 with reference to the vibration information 21A in such a manner that a generation interval of vibration is a generation interval a4 that corresponds to a display position Db provided by moving by an amount of movement Lx from the display position Da that corresponds to a generation interval a3.

In such a case, the on-vehicle apparatus control unit 51 causes the display 55 to display an image with a cursor I that is displayed at the display position Db provided by moving the cursor I from the display position Da in a direction of the X-axis by the amount of movement Lx.

In such a state, for example, a user may release his or her finger from the operation surface P and subsequently operate the operation surface P again. In such a case, as a touch position C moves from the touch position Ca to the touch position Cx on the operation surface P in a direction of the X-axis by the amount of movement Lx again, the vibration control unit 13 controls a vibration mode of the vibration unit 30 in such a manner that the generation interval a4 that corresponds to the previous display position Db is referred to and a generation interval is changed from the generation interval a4 to a generation interval a5 that corresponds to a display position Dc.

Similarly, the on-vehicle apparatus control unit 51 causes the display 55 to display an image provided by moving a cursor I from the display position Db to the display position Dc in a direction of the X-axis by an amount of movement Lx.

Also in a case where a touch position C moves in a direction of the Y-axis, a process similar to that of the X-axis is executed. That is, a vibration intensity is associated with a direction of the Y-axis on the display 55, and hence, the vibration control unit 13 controls a vibration intensity depending on a display position of a cursor I.

Thus, in the variation, a vibration mode is controlled based on an image on the display 55, so that a user can intuitively be provided with a sense of touch that corresponds to display content on the display 55 and operability of the input device 1 can be improved.

In the embodiment as has been described above, a case where the vibration control unit 13 controls a generation interval of vibration, namely, an on/off ratio of vibration, of the vibration unit 30 to control a vibration mode discontinuously has been illustrated and this is not limiting. That is, the input device 1 can also change a vibration mode of the vibration unit 30 continuously.

Figure 9A:
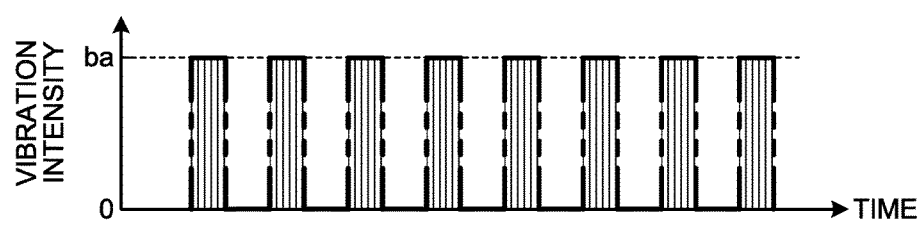
FIG. 9A to 9C are schematic diagrams illustrating specific examples of a vibration mode.
Figure 9B:
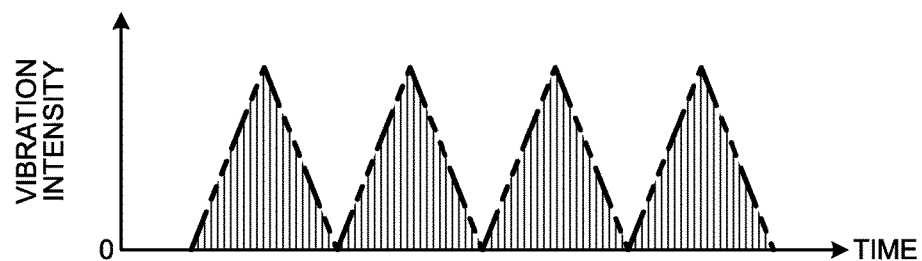
Figure 9C:
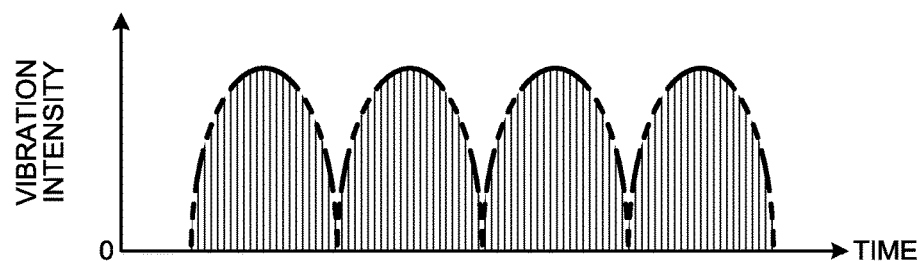

Herein, a case where a vibration mode is discontinuously changed by the input device 1 and a case where it is changed continuously will be described by using FIGS. 9A to 9C. FIGS. 9A to 9C are schematic diagrams illustrating specific examples of a vibration mode, wherein FIG. 9A illustrates a case where a vibration mode is controlled discontinuously. FIG. 9B and FIG. 9C illustrate cases where a vibration intensity is changed continuously. In FIGS. 9A to 9C, a vertical axis and a horizontal axis represent a vibration intensity and time, respectively. In FIGS. 9A to 9C, one ultrasonic vibration is indicated by one line that extends in a direction of a vertical axis.

First, a case where a vibration mode is controlled discontinuously, that is, a case where the sense of touch like irregularities as described above is provided, will be described by using FIG. 9A. As illustrated in FIG. 9A, the vibration control unit 13 executes control for discontinuously changing a vibration intensity between a vibration intensity ba and a vibration intensity 0 depending on time in such a manner that a waveform of ultrasonic vibration is rectangular.

On the other hand, in examples as illustrated in FIG. 9B and FIG. 9C, the vibration control unit 13 executes control for continuously changing a vibration intensity. Specifically, in an example as illustrated in FIG. 9B, the vibration control unit 13 executes control in such a manner that an interval where a vibration intensity is changed to increase gradually depending on time and an interval where a vibration intensity is changed to decrease gradually are repeated with a predetermined period of time so that a waveform of ultrasonic vibration is a triangular waveform.

In an example as illustrated in FIG. 9C, the vibration control unit 13 executes control for continuously changing a vibration mode in such a manner that time and a vibration intensity include a curve with periodicity so that a waveform of ultrasonic vibration is a sinusoidal waveform.

Thus, the input device 1 can control a vibration mode discontinuously or continuously. Relationships between a vibration intensity and time as illustrated in FIGS. 9A to 9C are examples, and this is not limiting. The input device 1 can also combine waveforms as illustrated in FIGS. 9A to 9C to execute control thereof. Thereby, the input device 1 can provide a user with a sense of touch other than a sense of touch like irregularities.

As described above, the input device 1 may be configured to vibrate the operation surface P in a frequency band lower than an ultrasonic region (at a frequency in a lower frequency band). In a case of vibration at such a lower frequency, for example, vibration at a lower frequency as represented by an envelope of ultrasonic vibration as illustrated in one of FIGS. 9A to 9C may be provided. In FIGS. 9A to 9C, the envelope as described above is indicated by an imaginary line.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An input device, comprising:
a vibration unit that includes a piezoelectric element, the vibration unit vibrating an operation surface; and
a processor programmed to:
detect touch positions on the operation surface;
when the touch positions move in a first direction, cause the vibration unit to vibrate in a first mode associated with a first movement amount of the touch positions in the first direction;
when the touch positions move in a second direction, cause the vibration unit to vibrate in a second mode associated with a second movement amount of the touch positions in the second direction; and
when the touch positions move in a third direction located between the first and second directions and obtained by composing the first and second directions, cause the vibration unit to vibrate in a third mode associated with a third movement amount, the third movement amount being obtained by composing first and second movement amounts corresponding to first and second direction components constituting the third direction.

2. The input device according to claim 1, wherein the processor is further programmed to control a generation interval of vibration to be caused by the vibration unit depending on the amount of movement of the touch position in the first direction and control a vibration intensity to be caused by the vibration unit depending on the amount of movement of the touch position in the second direction.

3. The input device according to claim 1, wherein the first direction and the second direction are associated with operation instructions with mutually different contents.

4. The input device according to claim 3, wherein the operation instructions with mutually different contents are an operation instruction with respect to temperature of an air conditioner and an operation instruction with respect to air volume thereof.

5. The input device according to claim 1, wherein the processor is further programmed to:
cause a speaker to output a sound dependent on a mode of the first to third modes.

6. The input device according to claim 1, wherein the first direction and the second direction are substantially orthogonal to one another.

7. A display device, comprising:
the input device according to claim 1; and
a display that displays an image dependent on the detected touch position.

8. A method for controlling an input device, comprising:
detecting touch positions on an operation surface; and controlling a vibration unit including a piezoelectric element that vibrates the operation surface to:

cause, when the touch positions move in a first direction, the vibration unit to vibrate in a first mode associated with a first movement amount of the touch positions in the first direction;

cause, when the touch positions move in a second direction, the vibration unit to vibrate in a second mode associated with a second movement amount of the touch positions in the second direction; and cause, when the touch positions move in a third direction located between the first and second directions and obtained by composing the first and second directions, the vibration unit to vibrate in a third mode associated with a third movement amount, the third movement amount being obtained by composing first and second movement amounts corresponding to first and second direction components constituting the third direction.

* * * * *